United States Patent
Kim

(10) Patent No.: US 9,868,345 B2
(45) Date of Patent: Jan. 16, 2018

(54) ROLL-ROD FOR VEHICLE

(71) Applicants: Hyundai Motor Company, Seoul (KR); Kia Motors Corporation, Seoul (KR)

(72) Inventor: Hyo-Seok Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/866,466

(22) Filed: Sep. 25, 2015

(65) Prior Publication Data

US 2016/0221430 A1 Aug. 4, 2016

(30) Foreign Application Priority Data

Feb. 4, 2015 (KR) ......................... 10-2015-0017065

(51) Int. Cl.
*F16M 1/00* (2006.01)
*B60K 5/12* (2006.01)
*F16F 1/371* (2006.01)
*F16F 1/38* (2006.01)

(52) U.S. Cl.
CPC ............ *B60K 5/1241* (2013.01); *F16F 1/371* (2013.01); *F16F 1/3849* (2013.01); *F16F 2230/0041* (2013.01)

(58) Field of Classification Search
CPC .......... F16F 1/373; F16F 13/10; B60K 5/1208
See application file for complete search history.

(56) References Cited

U.S. PATENT DOCUMENTS

| 8,002,252 | B2 | 8/2011 | Howorth et al. |
| 8,403,097 | B2* | 3/2013 | Joly ........................ F16F 1/373 180/291 |
| 8,839,900 | B2* | 9/2014 | Kim .................... F16F 13/1463 180/312 |
| 2015/0204406 | A1* | 7/2015 | Yoon ....................... F16F 6/005 248/562 |

FOREIGN PATENT DOCUMENTS

| JP | 2007-308016 A | 11/2007 |
| JP | 2011-75006 A | 4/2011 |
| JP | 2011-208705 A | 10/2011 |
| KR | 10-0471901 B1 | 3/2005 |
| KR | 10-2009-0114160 A | 11/2009 |
| KR | 10-2011-0060424 A | 6/2011 |
| KR | 10-1184281 B1 | 9/2012 |
| KR | 10-1316827 B1 | 10/2013 |

\* cited by examiner

*Primary Examiner* — Amy Sterling
(74) *Attorney, Agent, or Firm* — Morgan, Lewis & Bockius LLP

(57) ABSTRACT

A roll-rod for a vehicle which is mounted so as to connect a sub-frame and a power train may include at least one rubber block mounted between a front body portion and a rear end plate, in which the rubber block disposed at a rearmost part may be formed with a "U"-shaped band portion having an opening to which the end plate is fitted and joined wherein the "U"-shaped band portion is open in a vertical direction to the axial direction of a rearmost rubber block of the at least one rubber block to form the opening.

8 Claims, 6 Drawing Sheets

Occurence of damage

ROLL-ROD FOR VEHICLE

CROSS-REFERENCE TO RELATED APPLICATION

The present application claims priority to Korean Patent Application No. 10-2015-0017065 filed Feb. 4, 2015, the entire contents of which is incorporated herein for all purposes by this reference.

BACKGROUND OF THE INVENTION

Field of the Invention

The present disclosure relates to a roll-rod for a vehicle which is attached to a sub-frame (a front cross member) and in which a distal end of a body portion is connected to a power train to support the behavior of the power train. More particularly, the present invention relates to a roll-rod for a vehicle invented to be able to improve the durability, by controlling the abnormal behavior of an end plate to prevent damage to the rearmost rubber block.

Description of Related Art

Passenger vehicles mainly use a monocoque body with light weight and excellent productivity in place of a frame body. The monocoque body is a structure in which a separate frame is deleted, and a power train provided by a combination of an engine with a transmission is directly mounted to an engine room of a vehicle body. Therefore, in the monocoque body, the vehicle body itself functions as a frame, and a suspension and chassis components are mounted, respectively. However, in order to prevent the vibration of the power train from being directly transmitted to the vehicle body and distribute the impact at the time of collision of the vehicle, a sub-frame is mounted to the lower part of the vehicle.

A suspension device, a steering device or the like is mounted to the sub-frame, and the sub-frame is connected to the lower part of the power train through a roll-rod. That is, each of an engine mount and a transmission mount is mounted on both sides of the vehicle body to support the load of the power train, and the mounted roll-rod of the sub-frame shares the control of the displacement and the vibration damping of the power train.

Meanwhile, as illustrated in FIG. 1A and FIG. 1B, the conventional roll-rod includes a body part 1 which is connected to the power train at a distal end and has a bar-like shape, and a metallic end plate 5 which is coupled to a distal end of a pipe extending to a rear side of the body 1, and a bracket 3 is mounted between the body portion 1 and the end plate 5 so as to be able to be coupled to the sub-frame. Moreover, it is constituted in a manner that rubber blocks 2, 4, 7 made of a rubber material (or a synthetic resin material) are disposed on each of the front side and rear side of the bracket 3.

Each of the front and rear rubber blocks 2, 4, 7 control the behavior of the power train during forward and backward movement of the vehicle, and are elastically deformed to insulate the vibration. At this time, the rear rubber blocks 4, 7 for controlling the behavior of the power train during the forward movement of the vehicle are formed to be thicker than the front rubber block so as to enhance durability and smoothly support the behavior during the quick start when a large load is generated, or two or more rear rubber blocks may be disposed. Moreover, the end plate 5 is fixed to the distal end of the pipe via a bolt 6 and a nut 8 to support the rearmost rubber block 4.

However, in the structure in which two or more rubber blocks 4, 7 are disposed between the end plate 5 the bracket 3 on the back side, the excessive compression and expansion are concentrated in the rearmost rubber block 4 (even though the rearmost rubber block is assembled with the end plate in the state of being bonded with adhesive), and thus, there is a problem in which a damage occurs as illustrated in FIG. 1C, and disengagement occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a roll-rod for a vehicle capable of suppressing disengagement and damage of the rearmost rubber blocks.

According to various aspects of the present invention, a roll-rod for a vehicle which is mounted so as to connect a sub-frame and a power train may include at least one rubber block mounted between a front body portion and a rear end plate, in which the rubber block disposed at a rearmost part may be formed with a band portion to which the end plate is fitted and joined.

The band portion may be manufactured so as to be integrally molded when manufacturing the rubber block disposed at the rearmost part.

The band portion may include two or more bands that are spaced apart from each other and are joined by fitting the end plate into each of them.

The end plate may be formed with a guide portion for fixing the bands.

A protruding portion may protrude from a surface of the end plate facing the rubber block disposed at the rearmost part, and the rubber block disposed at the rearmost part may be formed with a slide groove through which the protruding portion enters when the end plate slides and is fitted to the band portion.

Since the present invention having the configuration as described above has a structure in which the rubber block disposed at the rearmost part is restrained to the end plate by the band portion, a conventional adhesive application process may be removed, and it is possible to improve marketability by suppressing the disengagement or damage of the rubber block.

In addition, since the end plate and the rearmost rubber are coupled to each other by insertion of the protruding portion and the slide groove, it is possible to further suppress the rotation of the rubber block.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a roll-rod for a vehicle in which a bracket is fixed to a sub-frame, and a distal end of a body portion is connected so as to support behavior of a power train, and various embodiments of the present invention will be described in more detail below with reference to the drawings.

Figure 1A:
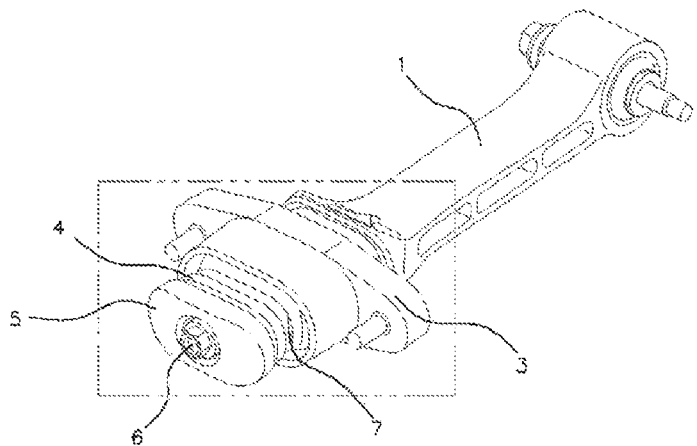
FIG. 1A and FIG. 1B are diagrams illustrating a partially cut state of a bracket so as to show an exterior and an internal structure of a conventional roll-rod bracket.
Figure 1B:
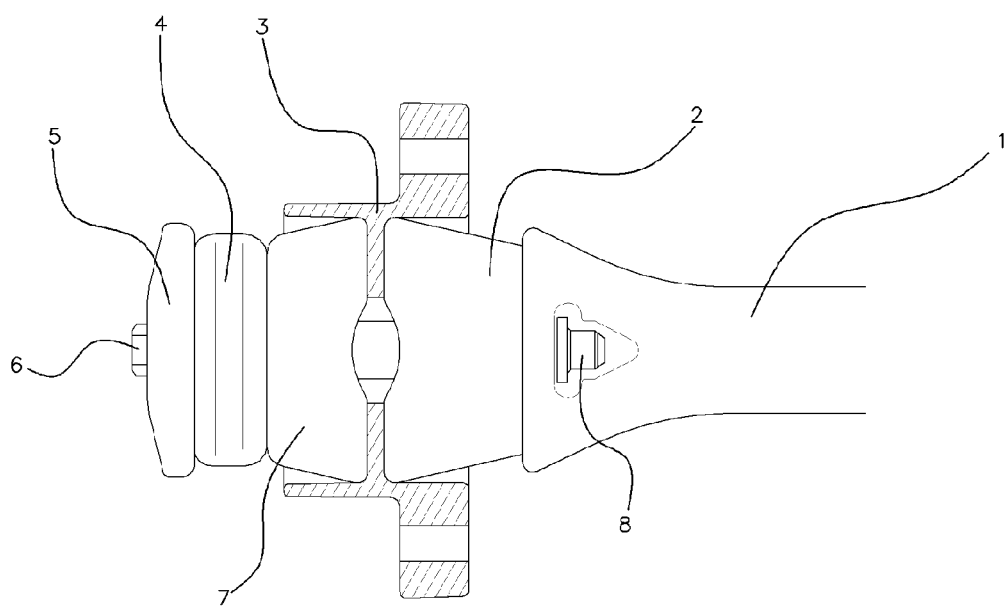
Figure 1C:
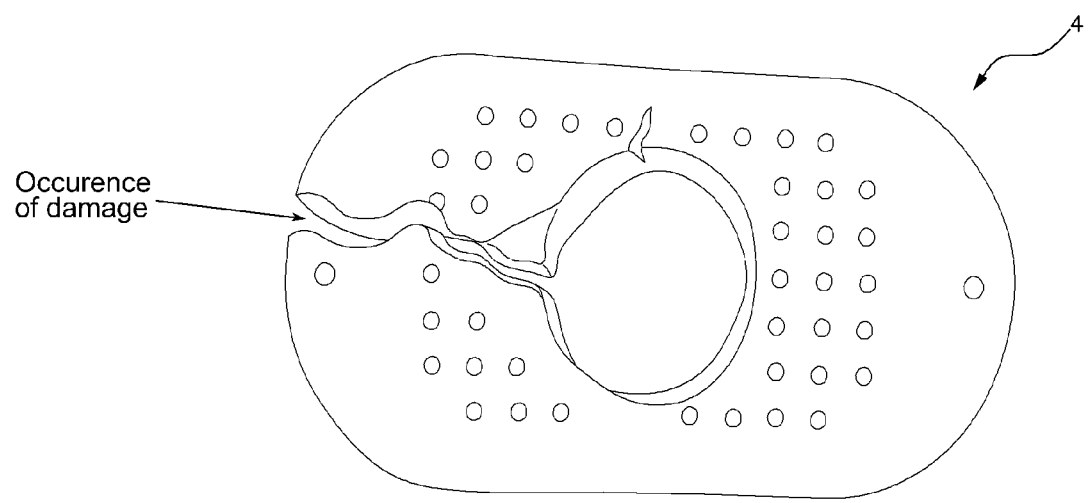
FIG. 1C is a diagram illustrating a damaged state of the rearmost rubber block in the conventional roll-rod structure.
Figure 2:
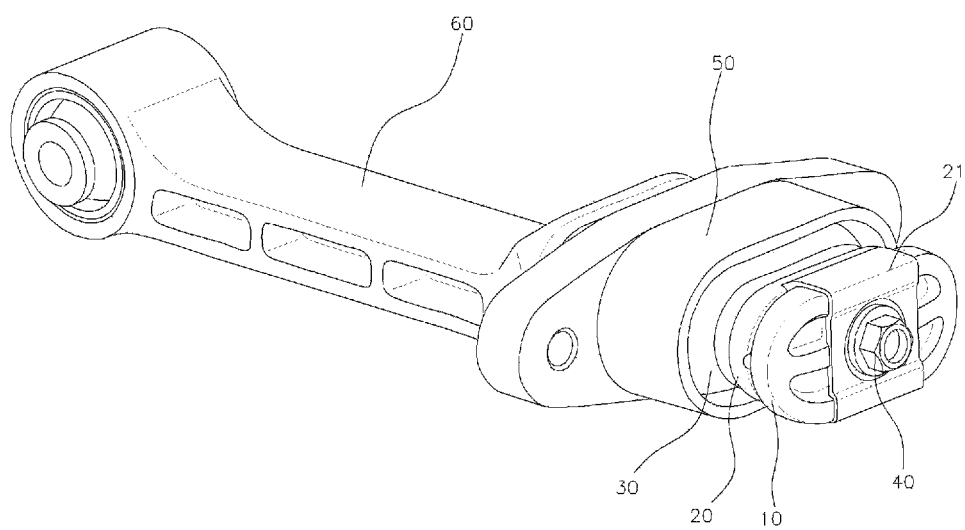
FIG. 2 is a perspective view of an exemplary roll-rod for a vehicle according to the present invention.

Referring to FIG. 2, as in the conventional roll structure, the roll-rod of the present invention includes a body portion 60 which is connected to a power train at a distal end and a bar-like shape, and a bracket 50 mounted to a sub-frame, front and rear rubber blocks are mounted inside the bracket 50, respectively, and a rearmost rubber block 20 is further mounted to the rear side of the rear rubber block 30. Moreover, each of the rubber blocks has a structure which is fixed to the body portion through 60 and the bracket 50 by a bolt 40 passing through the rubber blocks with the end plate 10.

In addition, in the present invention, the rubber block 20 disposed at the rearmost part is formed with a "U"-shaped band portion 21 to which the end plate 10 is laterally fitted and united. That is, as illustrated in FIG. 3A, FIG. 3B, FIG. 4A and FIG. 4B, in the rubber block 20 disposed at the rearmost part, the band portion 21 is integrally molded during manufacturing, and the band portion 21 has a structure that is laterally opened to form an opening 25 so as not to allow the movement of the rearmost rubber block 20 in a longitudinal direction.

Therefore, in the present invention, the end plate 10 is fitted by entering from the lateral direction of the band portion 21. In order to additionally prevent the shaking and rotation of the rearmost rubber blocks 20, a protruding portion 11 protrudes from a surface of the end plate 10 facing the rubber block 20 disposed at the rearmost part, and the rearmost rubber block 20 is formed with a slide groove 22 through which the protruding portion 11 enters when the end plate 10 slides and is fitted to the band portion 21.

Figure 3A:
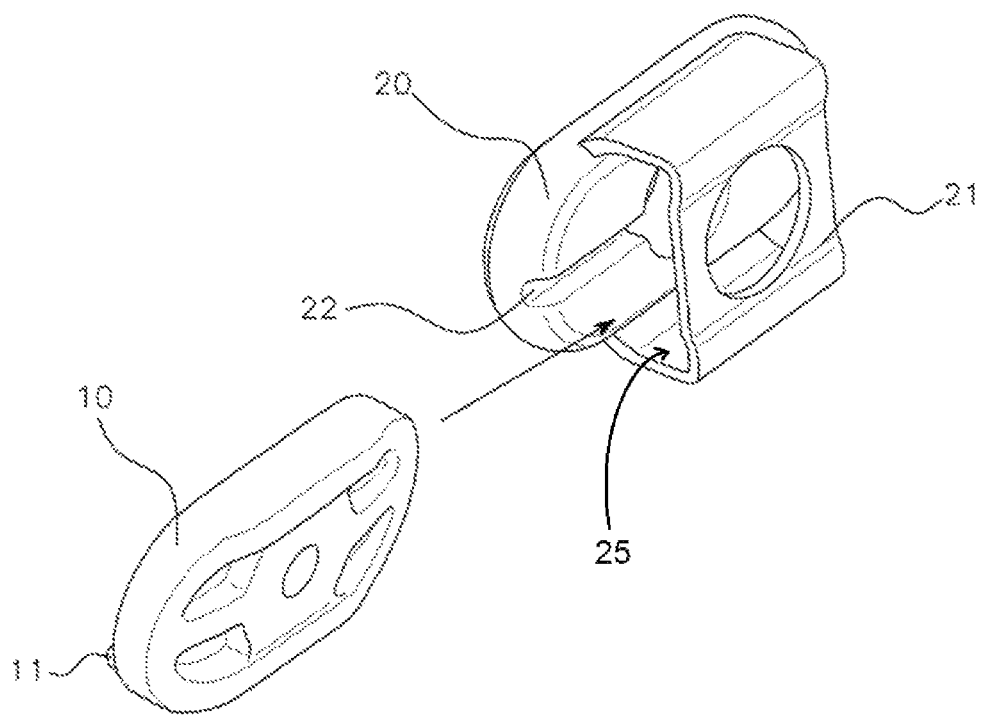
FIG. 3A and FIG. 3B illustrate a state in which an end plate is coupled to a rearmost rubber block according to the present invention.
Figure 3B:
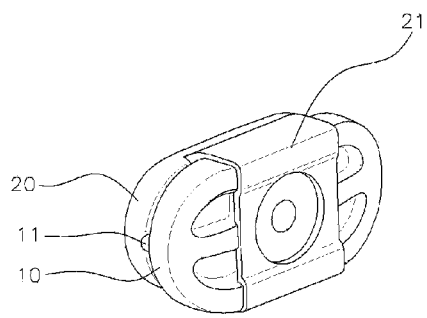
Figure 4A:
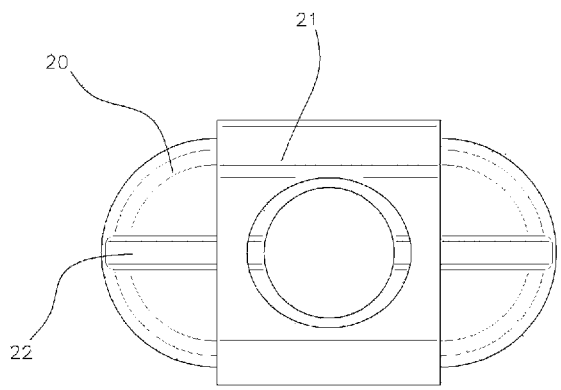
FIG. 4A is a diagram illustrating a rear view of the rearmost rubber block.
Figure 4B:
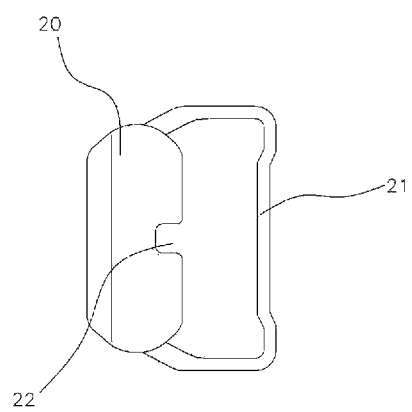
FIG. 4B is a diagram illustrating a side view of the rearmost rubber block according to the present invention.

The end plate 10 and the rearmost rubber block 20 are mounted to the bracket 50 and the body portion 60 by a bolt 40 penetrating them, while being coupled as in FIG. 3A and FIG. 3B.

Figure 5:
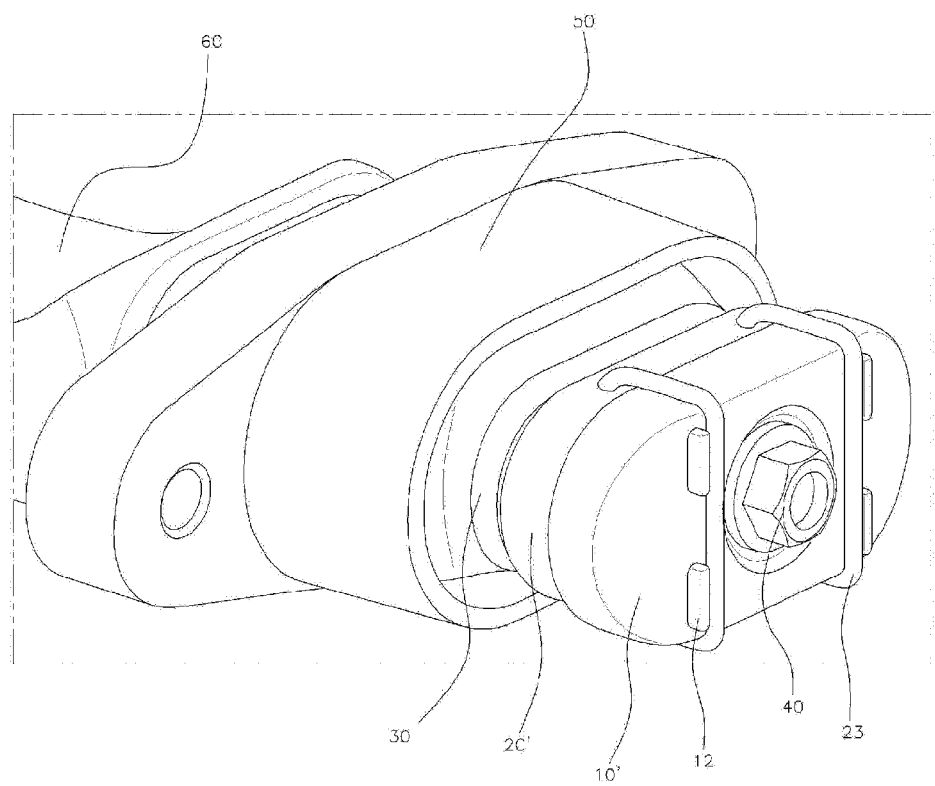
FIG. 5 is a diagram illustrating a state in which two bands are formed in the rearmost rubber block according to the present invention.

In addition, various embodiments of the present invention are illustrated in FIG. 5. In various embodiments of the present invention illustrated in FIG. 5, the band portion includes two or more bands 23 that are disposed to be spaced apart from each other and are each united by fitting an end plate 10'. Moreover, the end plates 10' is formed with a guide portion 12 for supporting the lateral behavior of each band 23.

In the present invention as described above, the band portion 21 is formed to have a size which allows the end plate 10 to enter by a shrink-fitting, in a state in which its diameter is elastically expanded. Thus, since the end plate 10 maintains a state of being fixed by the elastic force of the material of the band portion 21, the rearmost rubber block 20 can maintain a state of being firmly restrained by the end plate 10, even if the expansion and contraction occurs (depending on the behavior of the power train).

That is, even if the repeated load of compression and tension is input to the entire roll-rod, the rearmost rubber block 20 has binding force by the elastic force of the band portion 21 so that the relative flow and the rotational movement with respect to the end plate 10 do not occur. Thus, even if there is no mounting of a separate accessory or application of adhesive for anti-rotation, the rotational flow of the rearmost rubber block 20 is suppressed, and the adhesive failure and the disengagement are prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roll-rod for a vehicle which is mounted so as to connect a sub-frame and a power train, the roll-rod comprising:
   at least one rubber block mounted between a front body portion and a rear end plate; and
   a "U"-shaped band portion fixed to a rearmost rubber block of the at least one rubber block and disposed at the rearmost of the at least one rubber block so as not to allow the rearmost rubber block to move in an axial direction of the rearmost rubber block wherein the "U"-shaped band portion is open in a vertical direction to the axial direction of the rearmost rubber block to form an opening, wherein the rear end plate is disposed between the rearmost rubber block and the "U"-shaped band portion and configured to be fitted inside the opening of the "U"-shaped band portion and joined by the "U"-shaped band portion.

2. The roll-rod for the vehicle of claim 1, wherein the "U"-shaped band portion is manufactured so as to be integrally molded when manufacturing the rearmost rubber block.

3. The roll-rod for the vehicle of claim 2, wherein the band portion comprises two or more bands that are spaced apart from each other and are joined by fitting the end plate into each of them.

4. The roll-rod for the vehicle of claim 3, wherein the end plate is formed with a guide portion for fixing the bands.

5. The roll-rod for the vehicle of claim 3, wherein a protruding portion protrudes from a surface of the end plate facing the rubber block disposed at the rearmost part, and the rubber block disposed at the rearmost part is formed with a slide groove through which the protruding portion enters when the end plate slides and is fitted to the band portion.

6. The roll-rod for the vehicle of claim 2, wherein a protruding portion protrudes from a surface of the end plate facing the rearmost rubber block and the rearmost rubber block is formed with a slide groove through which the protruding portion enters when the end plate slides and is fitted into the opening of the "U"-shaped band portion.

7. The roll-rod for the vehicle of claim 4, wherein a protruding portion protrudes from a surface of the end plate facing the rubber block disposed at the rearmost part, and the rubber block disposed at the rearmost part is formed with a slide groove through which the protruding portion enters when the end plate slides and is fitted to the band portion.

8. The roll-rod for the vehicle of claim 1, wherein a protruding portion protrudes from a surface of the end plate facing the rearmost rubber block and the rearmost rubber block is formed with a slide groove through which the protruding portion enters when the end plate slides and is fitted into the opening of the "U"-shaped band portion.

* * * * *